May 23, 1944.  L. F. NENNINGER ET AL  2,349,597
LUBRICATION SYSTEM FOR MACHINE TOOLS
Filed May 19, 1941    3 Sheets-Sheet 1
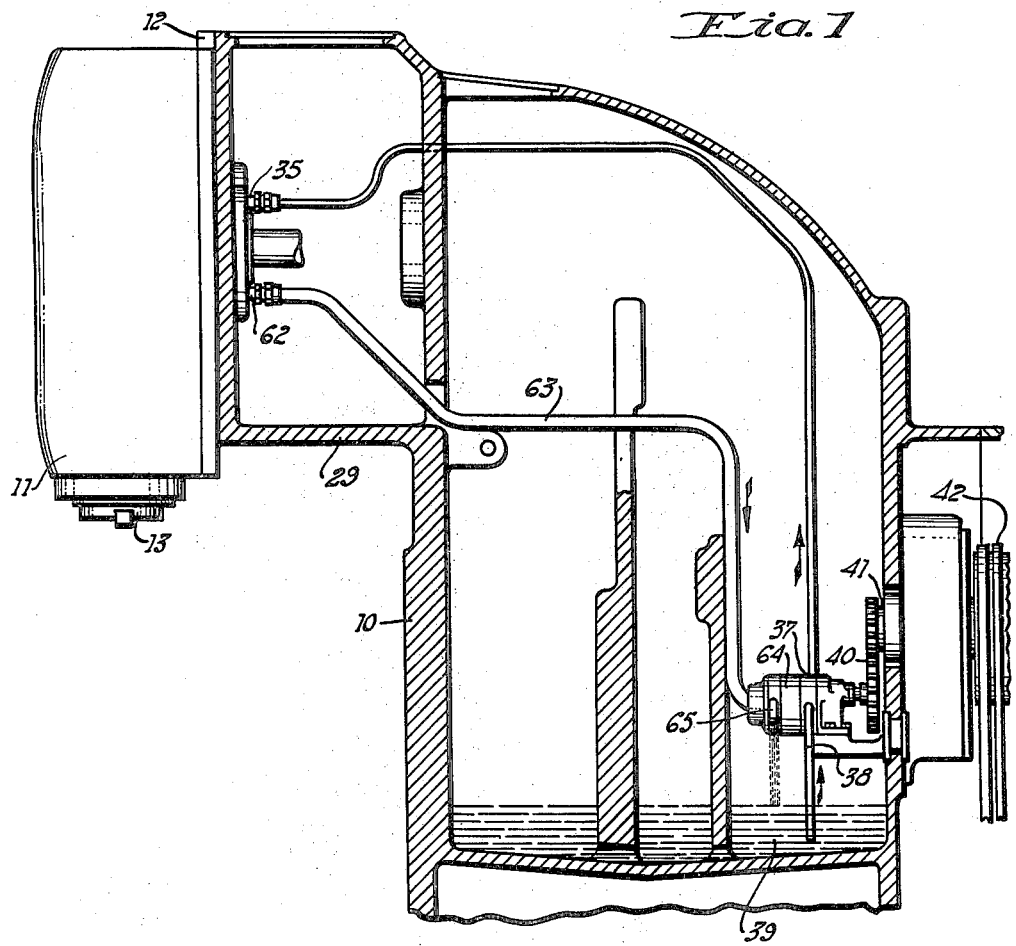
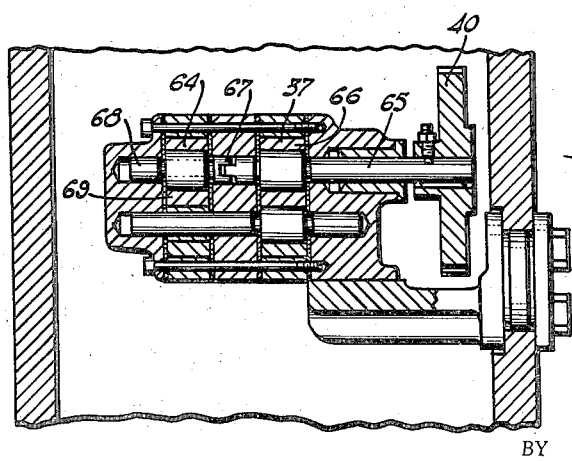
INVENTOR.
LESTER F. NENNINGER
EDGAR D. VANCIL
FRED A. HASSMAN
BY
ATTORNEY.

May 23, 1944.   L. F. NENNINGER ET AL   2,349,597
LUBRICATION SYSTEM FOR MACHINE TOOLS
Filed May 19, 1941   3 Sheets-Sheet 2

INVENTOR.
LESTER F. NENNINGER
EDGAR D. VANCIL
FRED A. HASSMAN
BY O. H. Parsons
ATTORNEY.

May 23, 1944. L. F. NENNINGER ET AL 2,349,597
LUBRICATION SYSTEM FOR MACHINE TOOLS
Filed May 19, 1941  3 Sheets-Sheet 3

INVENTOR.
LESTER F. NENNINGER
EDGAR D. VANCIL
FRED A. HASSMAN
BY
ATTORNEY.

Patented May 23, 1944

2,349,597

UNITED STATES PATENT OFFICE 2,349,597

LUBRICATION SYSTEM FOR MACHINE TOOLS

Lester F. Nenninger, Edgar D. Vancil, and Fred A. Hassman, Cincinnati, Ohio, assignors to The Cincinnati Milling Machine Co., Cincinnati, Ohio, a corporation of Ohio Application May 19, 1941, Serial No. 394,098

4 Claims. (Cl. 184—6)

This invention relates to machine tools and more particularly to improvements in a lubrication system therefor.

Many machine tools have auxiliary units which are slidably mounted on a main support and which contain operating mechanism requiring continuous lubrication. For lack of available space and the cost involved it is impractical to provide a self-contained lubricating system therein and resort must therefore be had to periodic manual lubrication which is unreliable at the best, or else supplied with lubricant from the main support. The latter system involves the problem of delivering lubricant to the unit in all its various positions as well as recovering the lubricant from the unit after it has served its purpose.

These problems are involved in the lubrication of vertical spindle carriers of milling machines, for instance, and since the spindle passes through the bottom wall of the carrier there is the additional problem of leakage around the spindle nose.

It is, therefore, an object of this invention to provide improved means for continuous lubrication of the operating mechanism in a movable unit of a machine tool from a source of supply contained in the main support of such machine.

Another object of this invention is to improve the lubrication of spindle carriers without leakage and resultant loss of lubricant at the point where the spindle passes through the bottom of the carrier.

A further object of this invention is to provide a lubricating system for movable units in which the lubricant is not only forcibly supplied to the unit but also forcibly withdrawn therefrom.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevational view particularly in section showing the application of this invention to a conventional machine tool such as a milling machine.

Figure 2 is an enlarged section through the pumping means.

Figure 3:
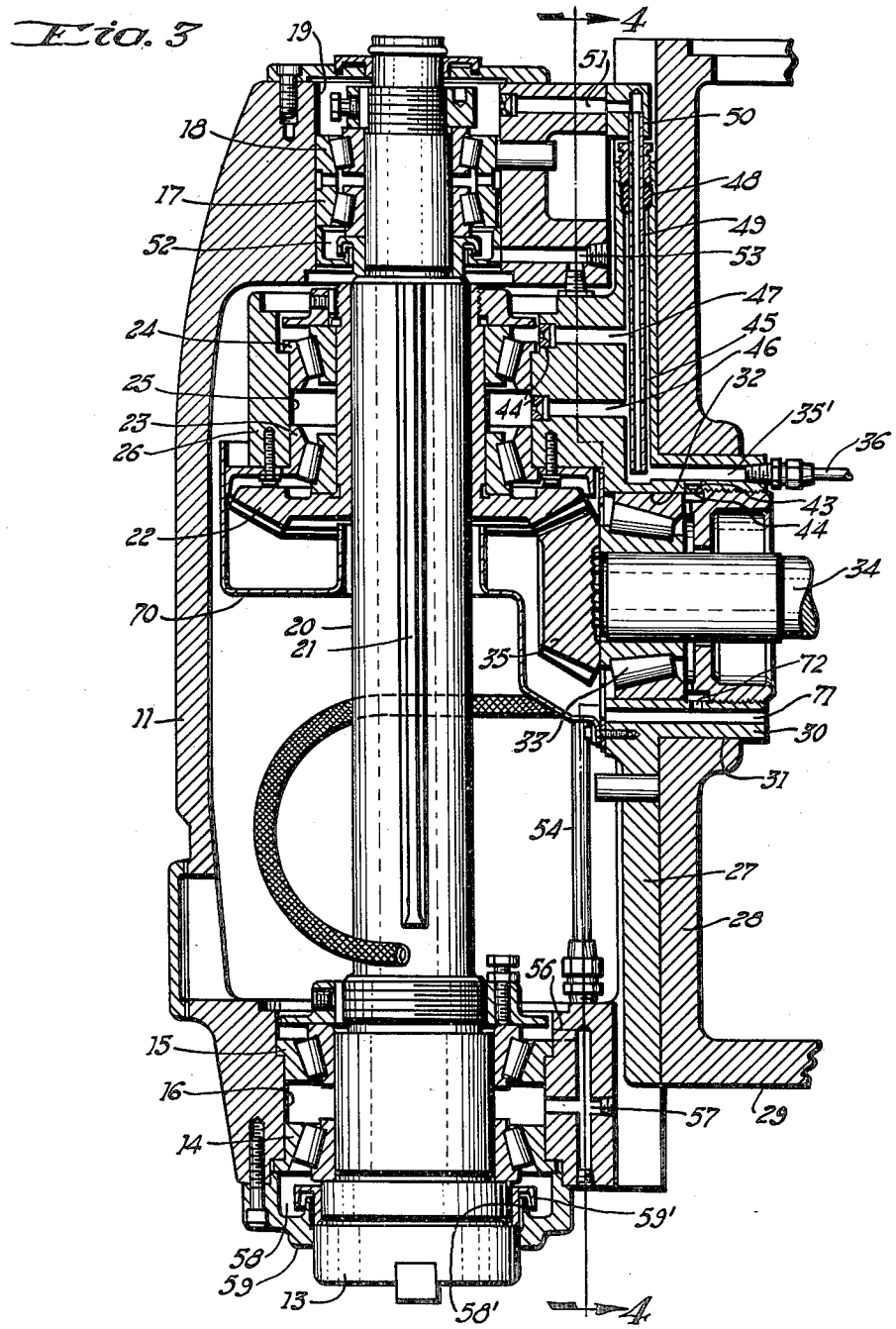
Figure 3 is a vertical section through the adjustable spindle carrier shown in Figure 1 of the drawings.

In Figure 1 of the drawings the reference numeral 10 indicates a fixed support of a machine tool such as the column of a vertical milling machine. The reference numeral 11 indicates an adjustable unit such as a spindle carrier which is slidably mounted on guides 12 for vertical adjustment to and from a work supporting unit not shown. The reference numeral 13 indicates a tool spindle which is journaled in the carrier and adapted to be power driven for rotation of a tool or other metal working device attached thereto.

It will be noted from Figure 3 that the spindle 13 passes through an aperture in the bottom of the carrier which obviously makes it impossible to utilize the bottom of the carrier for a lubricant reservoir.

The spindle 13 has its lower end journaled by a pair of anti-friction roller bearings 14 and 15 mounted in the aperture 16 formed in the bottom of the carrier 11. The upper end of the spindle is journaled by another pair of anti-friction roller bearings 17 and 18 located in an aperture 19 formed in the top of the spindle carrier. These bearings also act as thrust bearings to prevent axial movement of the spindle. The spindle and its supporting bearings all move with the spindle carrier when it is adjusted.

The intermediate portion 20 of the spindle is provided with splines 21 to provide a sliding driving connection with a bevel gear 22. This gear is anti-frictionally supported by roller bearings 23 and 24 which are mounted in an aperture 25 formed in a bearing bracket 26.

This bearing bracket has an integral plate 27 which is attached to the front wall 28 of the overhanging portion 29 of the column 10 and is therefore fixed with the column whereby the bevel gear 22 is held against axial movement. The plate 27 has an integral cylindrical boss 30 projecting from the rear face thereof and extending through a bore 31 formed in the wall 28 of the column.

The boss 30 has an aperture 32 in which is mounted an antifriction roller bearing 33 for supporting a drive shaft 34. The drive shaft has an integral bevel pinion 35 which intermeshes with the beveled gear 22 for transmitting rotation to the tool spindle.

It should now be apparent that there is a fixed bracket 26 containing a series of anti-friction bearings which require lubrication and that this bracket extends into the interior of the carrier which is also equipped with anti-friction bearings that require lubrication. The lubricating connections are made in the following manner. The cylindrical wall of the boss 30 is made sufficiently thick to provide longitudinal passageways which serve as connections between the source of lubricant supply in the column and the parts to be lubricated within the carrier. For instance, there is a longitudinal passage 35' which is supplied through a pipe 36 from a lubricant pump 37 which is suitably located in the column for power actuation. This pump has an intake 38 through which lubricant is withdrawn from a reservoir suitably located in the column 39. The pump is operatively connected by gearing 40 to a power shaft 41 which is actuated by the drive pulley 42.

The passage 35' has a radial branch 43 in the end of which is located a lubricant spray nozzle 44 for delivering lubricant to the anti-friction bearing 33. The passage 35' also intersects a vertical passage 45 which has two radial branches 46 and 47 equipped with lubricant spray nozzles 44 for delivering lubricant to the anti-friction bearings 23 and 24 respectively. The vertical passage 45 terminates in a stuffing box 48 through which slides a telescoping tube 49 movable with the carrier 11. The end of the tube is fixed in a bore 50 formed in the carrier which communicates with an interdrilled passage way 51 terminating in a spray nozzle 44 that supplies lubricant to the upper bearings 17 and 18 of the spindle.

The telescoping tube provides a sliding connection through which lubricant may be delivered to the upper bearings of the carrier in all of its vertical positions. The lubricant delivered to the upper bearings 17 and 18 eventually drains to a collector groove 52 which is connected by an interdrilled passage 53 in the carrier to a pipe 54, Figure 4. This pipe forms a closed passage for conductance of the lubricant by gravity to an interdrilled passage 55 located in the bottom of the carrier. This serves to conduct the lubricant from the upper bearings in the carrier to the lower bearings 15 and 14. The passage 55 has a branch 56 through which lubricant flows to bearing 15, and a second branch 57 through which lubricant is delivered to bearing 14. A collector groove 58 is formed in the cap 59 attached to the bottom of the carrier and surrounding the spindle. A drip ring 59' is tightly fitted to the end of the spindle and in overhanging relation to the lip 58' of the groove to direct lubricant running down the sides of the spindle into the groove.

Figure 4:
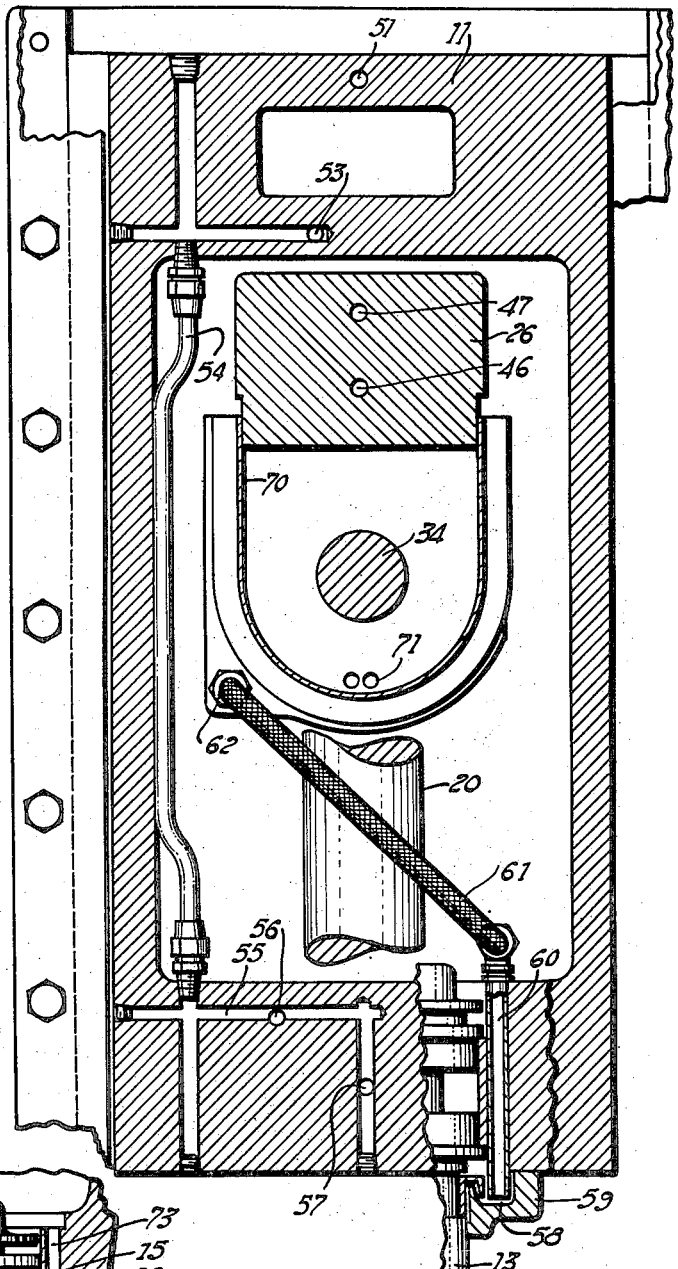
Figure 4 is a vertical section on the line 4—4 of Figure 3.

It will be obvious that if too much lubricant collects in this groove it will overflow and escape around the end of the spindle. Means have, therefore, been provided for removing this lubricant as fast at it collects and returning it to the reservoir in the column. To this end a suction tube 60, as shown in Figure 4, is mounted in the lower wall of the carrier and positioned to extend almost to the bottom of the collector groove 58. This suction tube is connected at the upper end by a flexible pipe 61 to a horizontal passage 62 formed in the wall of the boss 30 and this passage is connected by another pipe 63 to the intake of a suction pump 64.

This pump has a delivery outlet 65 for discharging the oil to the reservoir 39. As shown in Figure 2, the pumps 37 and 64 are gear pumps and arranged in tandem to be driven by a common drive shaft 65 to which the gear 66 of pump 37 is integrally connected.

The end of the shaft 65 has a tongue and slot connection 67 to the drive shaft 68 of pump 64 to which the drive gear 69 of that pump is connected. Thus, both pumps are simultaneously actuated through the same drive gear, one pump acting as a pressure pump and the other acting as an exhaust pump.

The lubricant supplied to the bearings in the bracket collects in a pan 70 which is attached to the bracket and flows by gravity to a passage 71 formed in the wall of the boss 30. This passage has a radial connection 72 through which lubricant from the bearing 33 drains. The passage 71 is open on the inside of the column whereby the lubricant flows by gravity back to the reservoir 39.

Figure 5:
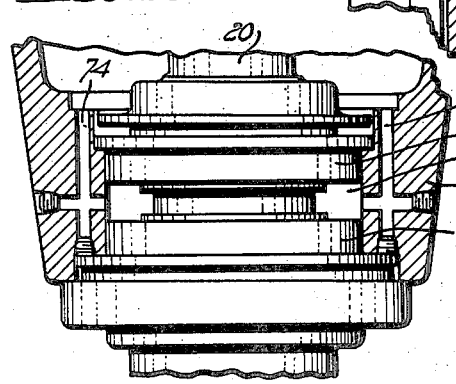
Figure 5 is an elevational view partly in section of the lower spindle bearings.

As shown in Figure 5, a pair of vertical drain passages 73 and 74 are provided for conducting lubricant which drains down the inside walls of the carrier to the bearing 14 and then to the collector groove 58.

There has thus been provided an improved lubricating system for an adjustable unit of a machine.

What is claimed is:

1. In a machine tool having a hollow support including top and bottom walls, a spindle, and bearing means for journaling the spindle in the top and bottom walls, said bottom wall having a passage through which the spindle passes, the combination of means for lubricating said bearings including a first pump for delivering lubricant to said bearings, and a second pump having an intake located below the bearing in the bottom wall and adjacent the lower end of said passage for withdrawing the lubricant discharged from said bearing to prevent lubricant loss through the spindle passage.

2. In a machine tool having a main support, vertical guideways formed on said support, a spindle carrier mounted on said guideways for vertical movement, a spindle journaled by spaced bearings in said carrier and a bracket fixed to the main support and projecting within said carrier between said spaced bearings, said bracket carrying driving mechanism for said spindle, the combination of means for lubricating said bearings including a passageway formed in said bracket, means within the fixed support for supplying lubricant under pressure to said passageway and forcing it to the bearings above said bracket, a telescoping tube connection arranged parallel to said guideways for conveying lubricant from said passageway to said bearings above said bracket in all positions of adjustment of said carrier, said passageway having branches for distributing lubricant to the driving mechanism in the bracket and to the bearings located below said bracket and additional passageways in the bracket for returning lubricant from the driving mechanism by gravity to said main support and by suction from the bearings below said bracket to the supply means in the main support for recirculation.

3. In a milling machine having a vertical column, a hollow spindle carrier guided for vertical movement on the face of said column and having top and bottom walls, said bottom wall having an aperture formed thereon, a tool spindle vertically journaled in the carrier and extending through said aperture for attachment of tools to the exposed end thereof, the combination with bearings for said spindle including a first bearing means mounted in the top wall, a second bearing means mounted in said aperture, of lubricating means therefor including a lubricant reservoir formed in the column below said carrier, pumping means within the column for forcing lubricant from said reservoir to said bearings, said bottom wall having means surrounding said spindle at the open end of said aperture and below said second bearing for collecting lubricant discharged from said second bearing, a tube extending into said collecting means, a second pumping means mounted within the column in tandem relation to the first pumping means, passageways for connecting said tube to the intake of said second pumping means and a common driver for actuating both of said pumping means.

4. In a milling machine having a vertical column, a hollow spindle carrier guided for vertical movement on the face of said column and having top and bottom walls, said bottom wall having an aperture formed therein, a tool spindle mounted within the carrier and extending through said aperture, means for journaling the spindle including a first bearing means mounted in the top wall and a second bearing means mounted within said aperture, a bracket integral with the face of said column and extending within said carrier for supporting power driving means in operative relation with said spindle, the combination of a lubricating system for lubricating said parts without losing lubricant from said system through said aperture including a lubricant reservoir formed in said column below said carrier, tandem pumping means mounted within said column adjacent said reservoir, a common driver for said pumping means, a first passageway formed in said bracket, means connecting one of said pumps for delivering lubricant under pressure from said reservoir to said passageway, channel means for connecting said passageway to the upper bearings and the drive mechanism located within said carrier, a return passage formed in said bracket for collecting and returning lubricant from said carrier by gravity to said column, means for conducting some of said lubricant to the bearing in said aperture, means associated with the bottom wall forming a groove around said spindle and below the bearing in said aperture for collecting the lubricant escaping from the lower bearing, and channel means interconnecting the intake of said second pump by way of said bracket with said groove for withdrawing lubricant from the groove at a rate greater than the rate at which the lubricant collects in said groove, thereby preventing loss of lubricant through said aperture.

LESTER F. NENNINGER.
EDGAR D. VANCIL.
FRED A. HASSMAN.